US007571326B2

(12) United States Patent
Chen

(10) Patent No.: US 7,571,326 B2
(45) Date of Patent: Aug. 4, 2009

(54) RELATIVE LATENCY DYNAMICS FOR IDENTITY AUTHENTICATION

(75) Inventor: Wenying Chen, Sacramento, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 805 days.

(21) Appl. No.: 11/138,511

(22) Filed: May 25, 2005

(65) Prior Publication Data

US 2006/0271790 A1 Nov. 30, 2006

(51) Int. Cl.
*H04L 9/32* (2006.01)
*H04L 9/00* (2006.01)
*H04K 1/00* (2006.01)

(52) U.S. Cl. ................. 713/186; 713/185; 726/28; 382/115

(58) Field of Classification Search ............... 713/186, 713/185; 726/28; 382/115
See application file for complete search history.

(56) References Cited

U.S. PATENT DOCUMENTS

| 4,621,334 A | * | 11/1986 | Garcia .................. 382/115 |
| 5,557,686 A | * | 9/1996 | Brown et al. ............. 382/115 |
| 6,405,922 B1 | * | 6/2002 | Kroll ..................... 235/379 |
| 7,206,938 B2 | * | 4/2007 | Bender et al. ............ 713/186 |
| 2004/0187037 A1 | * | 9/2004 | Checco .................. 713/202 |

OTHER PUBLICATIONS

Lin, Daw-Tung. "Computer-Access Authentication with Neural Network Based Keystroke Identity Verification", 1997 IEEE.*
Bergadano, Francesco et al. "User Authentication through Keystroke Dynamics", 2002 ACM.*
Yamaguchi, Toshimitsu et al., "A Personal Authentication With Keystroke Timing Patterns," Proceedings of the Conference WWDU 2002 World Wide Work, May 22-25, 2002, pp. 1-2.
Samarati, Pierangela et al., "Access Control: Policies, Models, And Mechanisms," R. Focardi and R. Gorrieri (eds.), FOSAD 2000, LNCS 2171, pp. 137-196.
Monrose, Fabian et al., "Authentication Via Keystroke Dynamics," No publication information available, pp. 1-11.
Joyce, Rick et al., "Identity Authentication Based on Keystroke Latencies," Communications of the ACM, vol. 33, No. 2, Feb. 1990, pp. 168-176.

* cited by examiner

*Primary Examiner*—Michael J Simitoski

(57) ABSTRACT

A method for authenticating user access by a user to an electronic device. The method includes measuring a first plurality of relative latency values as keystrokes pertaining to an authentication process are entered. The method further includes determining whether the first plurality of relative latency values meet established statistical standards based on a previous plurality of relative latency values obtained from the user. The method also includes permitting the user access if the first plurality of relative latency values meet the established statistical standards based on the previous plurality of relative latency values obtained from the user.

18 Claims, 4 Drawing Sheets

RELATIVE LATENCY DYNAMICS FOR IDENTITY AUTHENTICATION

BACKGROUND OF THE INVENTION

The electronic storage of sensitive user specific information by a multitude of institutions has brought about the need for methods that prevent identity theft as well as unauthorized access. Unauthorized access may result in irrecoverable monetary and economic losses. User specific information may be accessed using input devices (e.g., keyboards) that may be found on a plurality of electronic devices, such as computers.

A popular method used to limit access to user specific information is through the identity authentication process. For example, in the authentication process, a unique username may be associated with a specific password. Access to a specific account is only granted if the correct password is provided with the specific username.

However, the ever-rapid improvement in computing power has increased the vulnerability of user specific information protected by passwords. Currently, easily accessible dictionaries containing volumes of common alphanumeric combinations may be downloaded from the Internet, making brute force disruptive methods (e.g., "dictionary attacks") possible. With further advancements, electronic devices with sufficient computing power to efficiently perform exhaustive search and match algorithms for all possible character combinations, based on the number of characters in the password field, may become readily available. Consequently, even strong passwords may become vulnerable.

To provide additional protection, some institutions have implemented account access fortification. Currently, account access fortification has been attempted through two general methods: biometric information and absolute keystroke time measurement identity authentication. The use of biometric information as a method of authentication involves measuring a person's physiological or behavioral features. Hence, biometric information may be collected through various methods such as fingerprints, facial feature recognition, DNA-based identification, and voice imprints. Since the usage of biometric information usually requires the installation of expensive information collection equipment at the user end, the use of biometric information as an authentication method has been limited.

Another method of account access fortification is through absolute keystroke time measurement identity authentication. This method does not require installation of specialized information collection equipment; however, the low accuracy rate has resulted in relatively few implementations.

To facilitate the discussion, FIG. 1 illustrates a flowchart of the absolute keystroke time measurement identity authentication method. At step 102, a new user logs onto the operating environment of an electronic device. At step 104, the new user is required to enter his username, password, first name and last name a plurality of times (e.g., eight times). At step 106, an algorithm is used to record the absolute time measurement of the new user's keystrokes. For example, the word "sam" involves the entry of three keystrokes—"s," "a," and "m". From time zero ($t_0$), the absolute time measurement for the letter "s" may be 0.4 second, the absolute time measurement for the letter "a" may be 0.8 second, and the absolute time measurement for the letter "m" may be 1.2 second.

At step 108, a plurality of time measurement data collected for each key press is subsequently used to calculate the mean and standard deviation values for each individual key. At step 110, the time measurement values for each key press that fall outside of a pre-established standard deviation value (e.g., three standard deviations) of the calculated time value for each key pressed are discarded. The mean and standard deviation values for the time measurement of each key press are then recalculated to establish acceptance criteria for future logon experience. At step 112, the user is accepted and is able to access the account.

For example, a user logs onto an account for the first time. The user provides a username of "sam," a password of "cat," a first name of "sam," and a last name of "tall". Assume that the user has to type each of these values eight times. Thus, for the username "sam" the user has to type each character eight times, so 24 absolute time measurement values are collected. The mean and standard deviation values are calculated from the time measurement values collected for each key press. Thus, the username "sam" will have mean and standard deviation values for each of the 3 characters. Once the mean and standard deviation values have been calculated, the absolute time measurement values for each key press are compared against the standard deviation values for that specific key press. The absolute time measurement values for each key press that are not within three standard deviation values are dropped and the remaining absolute time measurement values are used to recalculate the mean and standard deviation values to establish the acceptance criteria for future logon experience.

In future logon sessions, a registered user (step 114) logs onto an operating environment of an electronic device by typing in his username, password, first name and last name (step 116). The absolute time measurement values for the keystrokes entered for the aforementioned four variables are then obtained (step 118). At step 120, if more than a pre-established percentage (e.g., 60%) of the absolute time measurement values fall within the acceptance criteria established for each keystroke during the first logon session, the registered user is granted access (step 112) to the account information. However, if the absolute time measurement values are not within the acceptance criteria, then the user is denied access to the account (step 122).

There are several disadvantages associated with the absolute keystroke time measurement identity authentication method. Since the method relies on absolute keystroke time measurement values, users may be erroneously rejected if their typing speeds vary from one logon session to the next. Also, the timing analysis of this authentication method lacks sufficient details because it does not account for keystroke overlap (e.g., the time interval between the current key and the next key being pressed).

In other instances, artificial intelligence has been demonstrated to improve the accuracy of the absolute keystroke time measurement identity authentication method through the use of fuzzy logic, artificial neural networks, and genetic algorithms. However, a disadvantage with artificial intelligence is that the solution requires significant "training" time to allow the "intelligence" to recognize a user's typing pattern in order to predict future typing patterns. Furthermore, adding or removing a user account generally requires the "intelligence" to be re-trained, thus, rendering the process cumbersome to implement and execute.

SUMMARY OF INVENTION

The invention relates, in an embodiment, to a method for authenticating user access by a user to an electronic device. The method includes measuring a first plurality of relative latency values as keystrokes pertaining to an authentication process are entered. The method further includes determining whether the first plurality of relative latency values meet established statistical standards based on a previous plurality of relative latency values obtained from the user. The method also includes permitting the user access if the first plurality of relative latency values meet the established statistical standards based on the previous plurality of relative latency values obtained from the user.

In another embodiment, the invention relates to an arrangement for authenticating user access by a user to an electronic device. The arrangement includes means for measuring a first plurality of relative latency values as keystrokes pertaining to an authentication process are entered. The arrangement further includes means for determining whether the first plurality of relative latency values meet established statistical standards based on a previous plurality of relative latency values obtained from the user. The user access is permitted if the first plurality of relative latency values meet the established statistical standards based on the previous plurality of relative latency values obtained from the user In yet another embodiment, the invention relates to a method for authenticating user access by a user to an electronic device. The method includes measuring a first plurality of relative latency values for a plurality of user authentication entries entered by the user. The method further includes calculating a second plurality of relative latency values based on the first plurality of relative latency values. The method also includes calculating a third plurality of relative latency values. The set of third plurality of latency values are statistical representations of the first plurality of relative latency values and the second plurality of relative latency values. The method yet also includes employing the third plurality of relative latency values for authentication.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF VARIOUS EMBODIMENTS

Figure 1:
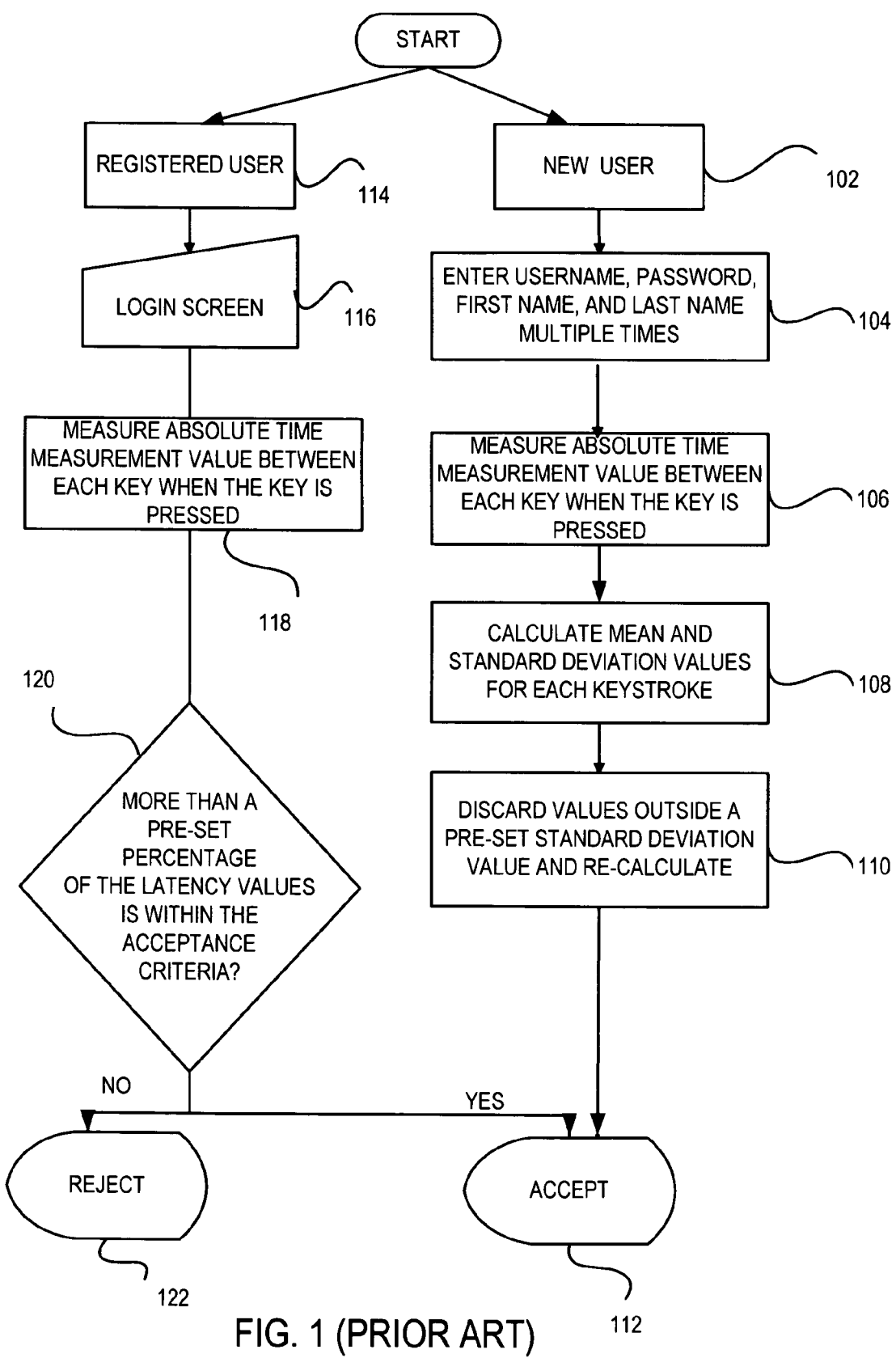
FIG. 1 illustrates a flowchart of the absolute keystroke time measurement identity authentication method.

The present invention will now be described in detail with reference to various embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover an article of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such an apparatus may include circuits, dedicated and/or programmable, to carry out operations pertaining to embodiments of the invention. Examples of such an apparatus include a general purpose computer and/or a dedicated computing device when appropriately programmed and may include a combination of a computer/computing device and dedicated/programmable circuits adapted for the various operations pertaining to embodiments of the invention.

Embodiments of the invention relate to a method for authenticating user access by a user to an electronic device by comparing a plurality of relative latency values, entered by the user during the current logon session, against an established statistical standards based on multiple sets of a plurality of relative latency values obtained from the user in the first logon session. The relative latency values represent the intra-keystroke and the keystroke-to-keystroke delay. For example, an intra-keystroke delay value may represent the delay between the time a keystroke is pressed and the time a keystroke is released. In another example, a keystroke-to-keystroke delay value may represent the delay from the time a keystroke is released to the time the next keystroke is pressed.

In an embodiment, a new user may be prompted via a user interface to enter a password using an input device (e.g., keyboard). The keystroke entries are employed to obtain a plurality of relative latency values. Prior to recording a plurality of relative latency values for the password, the new user may have an opportunity, in an embodiment, to develop and practice unique latency dynamics (e.g., patterns or rhythms). For each keystroke entered, there may be a plurality of time measurement values recorded to facilitate the calculation of the relative latency values.

The time measurement values for a password may be a key press time, a key hold time, a key release time, and a time before the next key press. The key press time and the key release time are values that may be measured. The key hold time may be calculated by subtracting the key press time from the key release time. The time before next key press may be calculated based on the difference between the next keystroke's key press time and the current keystroke's key release time. Note that it is possible that the time before next key press be a negative value if the next keystroke is pressed before the release of the current keystroke (i.e., overlapping keystrokes).

The user interface may provide a display environment that graphically displays the current latency dynamics, thus providing the user with immediate feedback. Further, part of the user interface may display previously collected latency dynamics, which may enable the user to develop a pattern by allowing comparisons between the current and the previous latency dynamics.

Once the user has developed latency dynamics that he is able to repeat, the user may begin recording the latency dynamics that may be used in defining an established statistical standards used as an acceptance criteria. In an embodiment, the new user's password may be entered a plurality of times (e.g., twenty times) to create a statistically significant pool of samples from which the relative latency values of the keystrokes may be accurately obtained.

To provide immediate feedback to the user, the latency dynamics data may be recorded and graphically displayed on a user interface. Subsequently, the multiple sets of collected measured and calculated relative latency values may be normalized and processed to establish a statistically significance acceptance criteria (e.g., standard deviations), which is used to compare against future logon relative latency values of the password entered.

In an embodiment, a registered user types a password to access an account. A plurality of relative latency values for each keystroke of the password may be measured, calculated, and compared against the established statistical standards used as acceptance criteria. The password is accepted only if the relative latency values of each keystroke of the password fall within the specified range of the established statistical standards that is used as acceptance criteria.

In an embodiment, the software that may be used to collect the relative latency values for each keystroke may be loaded onto a user's local electronic device. Localizing the software may eliminate any time measurement error that may be related to packet transmission delay over a network. Thus, network delay does not affect the accuracy of the relative latency value measurements and/or calculations.

Figure 2:
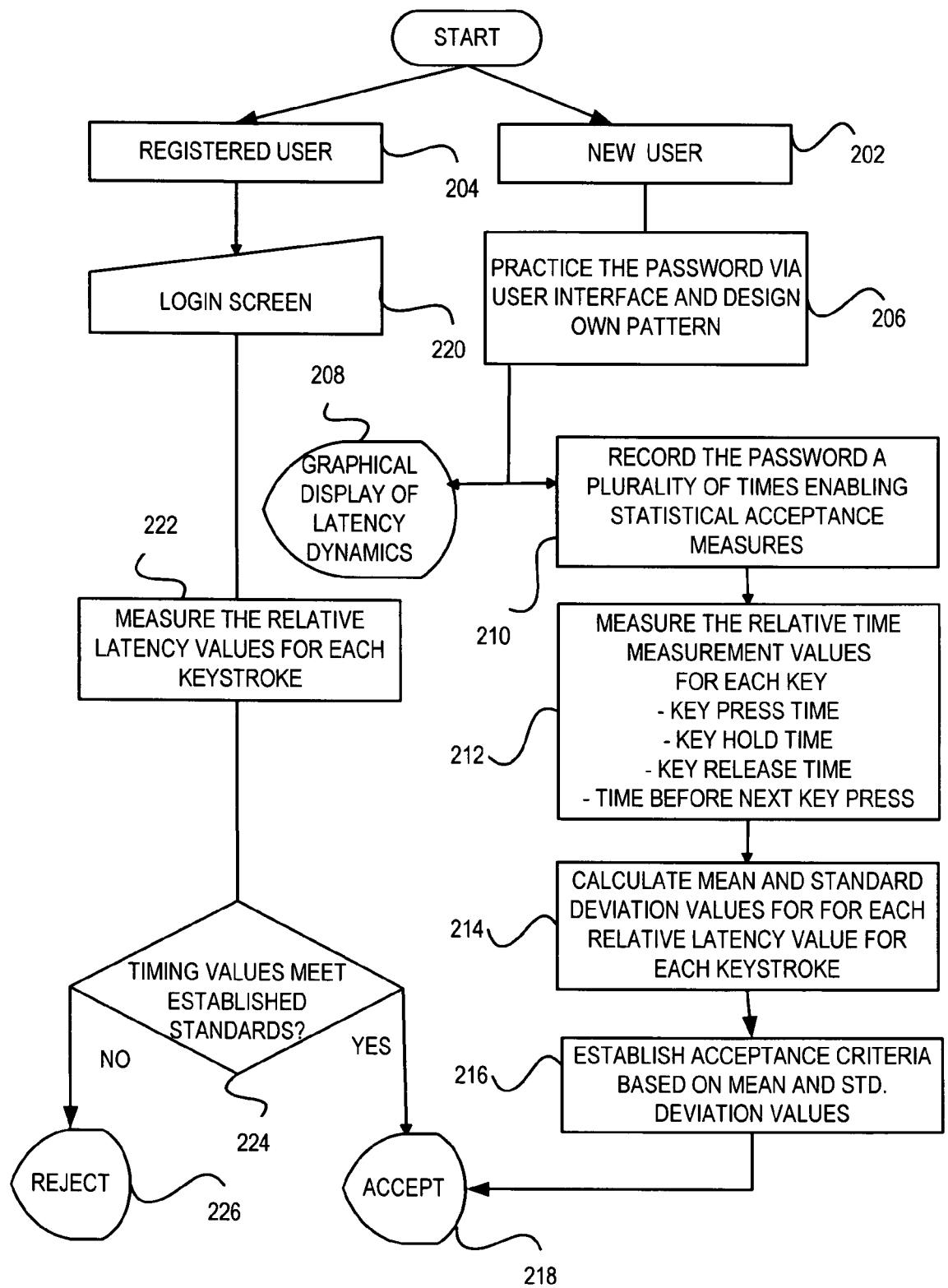
FIG. 2 represents, in accordance with an embodiment of the present invention, a flowchart illustrating the steps for employing a user's latency dynamics for password fortification in the identity authentication process.

The features and advantages of embodiments of the invention may be better understood with reference to the figures and discussions that follow. FIG. 2 represents, in accordance with an embodiment of the present invention, a flowchart illustrating the steps for employing a user's latency dynamics for password fortification in the identity authentication process. At step 202, a new user may log onto an operating environment of an electronic device (e.g., computer, ATM, cell phone, personal digital assistant, multifunction convergence device, digital security system, burglar alarm, digital safe, etc.). For example, a new user utilizes a computer to access the Internet in order to create a new account at www.e-bay.com. In creating a new account, the user is required to create a password. A user interface may be provided, which may enable the user to practice the password and develop unique latency dynamics (e.g., patterns or rhythms) (step 206).

Figure 3:
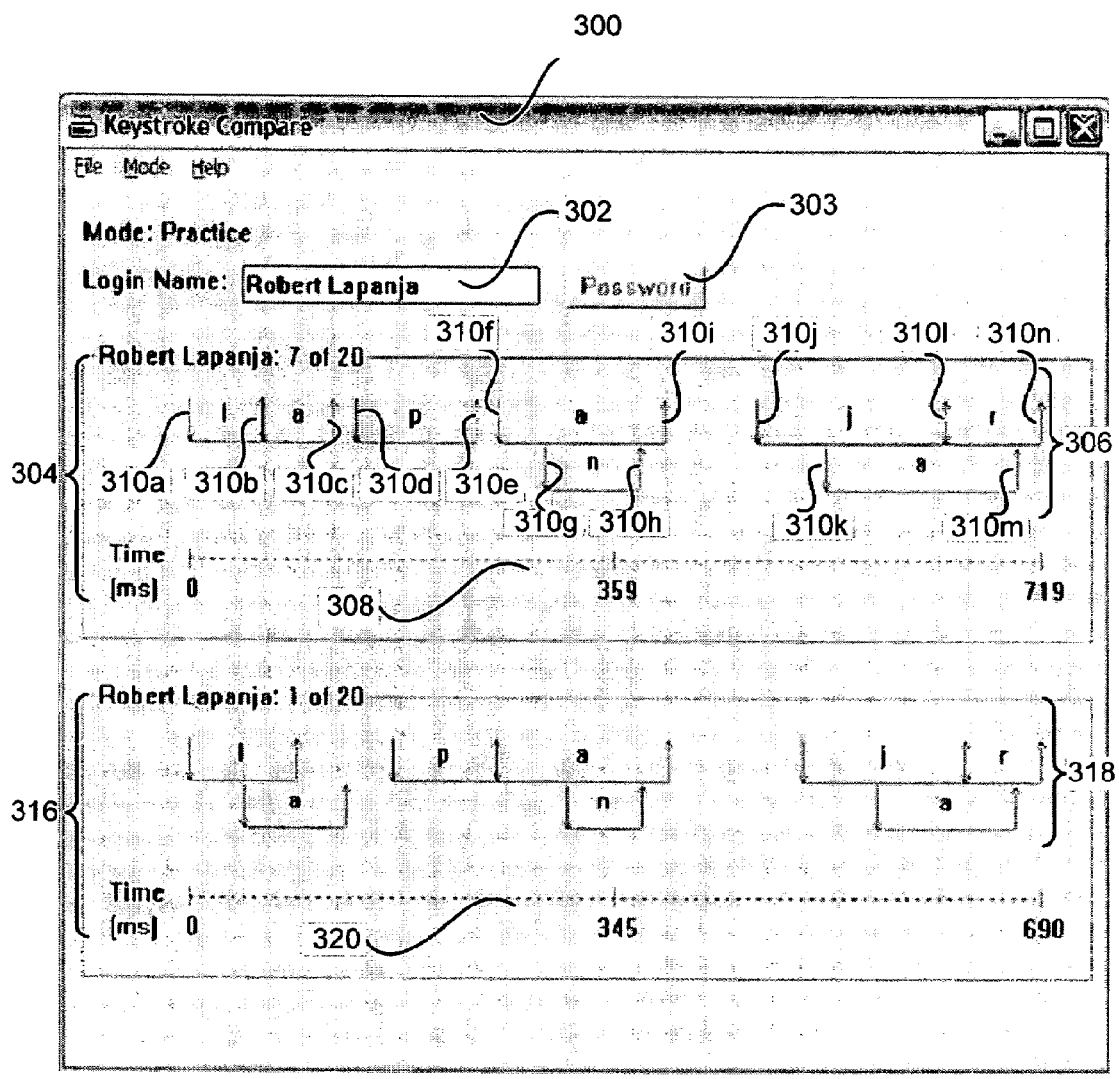
FIG. 3 shows, in accordance with an embodiment of the present invention, a user interface with the keystroke latency dynamics shown for the current and previously typed password.

FIG. 3 is used in conjunction with FIG. 2 to demonstrate the use of a user interface in the development of unique latency dynamics. FIG. 3 shows, in accordance with an embodiment of the present invention, a user interface 300. Employing user interface 300, a new user may enter his username in a text box 302. By clicking on a button 303, a dialogue box (not shown) may appear to allow the new user to type his password. The keystroke latency dynamics for the password (e.g., lapanjar), both current and previously typed, are shown in FIG. 3.

At step 208, the relative latency values collected for each of the keystrokes of the password may be displayed graphically on the user interface to provide the user a visual feedback. For example, a section 304 of user interface 300 may graphically display the latency dynamics of the current rendition of the password (306) and the corresponding relative time measurement values (308) while a section 316 may graphically display the latency dynamics of a prior rendition of the password (318) and the corresponding relative time measurement values (320).

For example, the keystroke latency dynamics of the password "lapanjar" are graphically displayed in section 304 of user interface 300. The user interface shows that the "l" key is pressed (a down arrow 310a) starting at $t_0$. Subsequently, the "l" key is released at the same time the "a" key is pressed (a double-headed arrow 310b). The "a" key is released (an up arrow 310c) and a few milliseconds later, the "p" key is pressed (a down arrow 310d). Note that the "p" key is pressed for a longer period of time than the keys "l" and "a" (as shown by the length of time that have passed). After the "p" key has been released (an up arrow 310e), the "a" key is pressed (a down arrow 310f). Before the "a" key is released, the "n" key is pressed (a down arrow 310g). The "n" key is actually released (an up arrow 310h) before the "a" key is released (an up arrow 310i). A few milliseconds later, the "j" key is pressed (a down arrow 310j). While the "j" key is still held down, the "a" key is pressed (a down arrow 310k). The "j" key is released and the "r" key is concurrently pressed down (a double-headed arrow 310l) while the "a" key is still being pressed down. The "a" key is finally released (an up arrow 310m) and shortly afterward, the "r" key is also released (an up arrow 310n).

As mentioned, user interface 300 may have a section 316 that displays a prior rendition of the keystroke relative latency values of the password. Section 316 is similar to section 304 in that section 316 may also display the latency dynamics (318) and the corresponding relative time measurement values (320). By comparing the latency dynamics in section 304 against the one in section 316, the user may be able to perform a comparison. Subsequently, the user may be able to create a rhythm that the user may be confident in reproducing in future logon sessions.

Once the new user has completed the practice session, the new user may begin the recording of the password. At step 210, the user may be requested to enter the password a plurality of times. In an embodiment of the invention, the password may be entered 20 times to create a statistical significant pool of samples from which the relative latency values of the keystrokes may be accurately obtained.

At step 212, a plurality of relative latency values for each keystroke may be measured. As mentioned before, the relative latency values represent the intra-keystroke and the keystroke-to-keystroke delay. At step 214, the mean and standard deviation values for the relative latency values associated with each of the password characters may be calculated using multiple recorded sets of a plurality of relative latency values.

At step 216, the established statistical standards used as acceptance criteria are created based on the values calculated in step 214. In an embodiment, the established statistical standards used as acceptance criteria are "mean +/−3 standard deviation". Based on these acceptance criteria, 99.7% of the probability of future "normal" inputs may fall within the acceptable criteria range and 0.3% of future inputs may fall outside of the acceptable criteria resulting in false rejections. Once the established statistical standards have been created, the user may access the new account (step 218).

In future logon sessions, a registered user (step 204) accesses the site and may be provided a login screen (step 220) to enter his password. The keystroke entries are employed to obtain a plurality of relative latency values (step 222), which are used to create the latency dynamics. The current latency dynamics of the password may be compared against the saved latency dynamics associated with the username (step 224). If the current relative latency values meet the established statistical standards recorded in the initial logon session, the user may be permitted access to the account (step 218). However, if the current latency dynamics fall outside the established statistical standard, then the user may be rejected (step 226).

Figure 4:
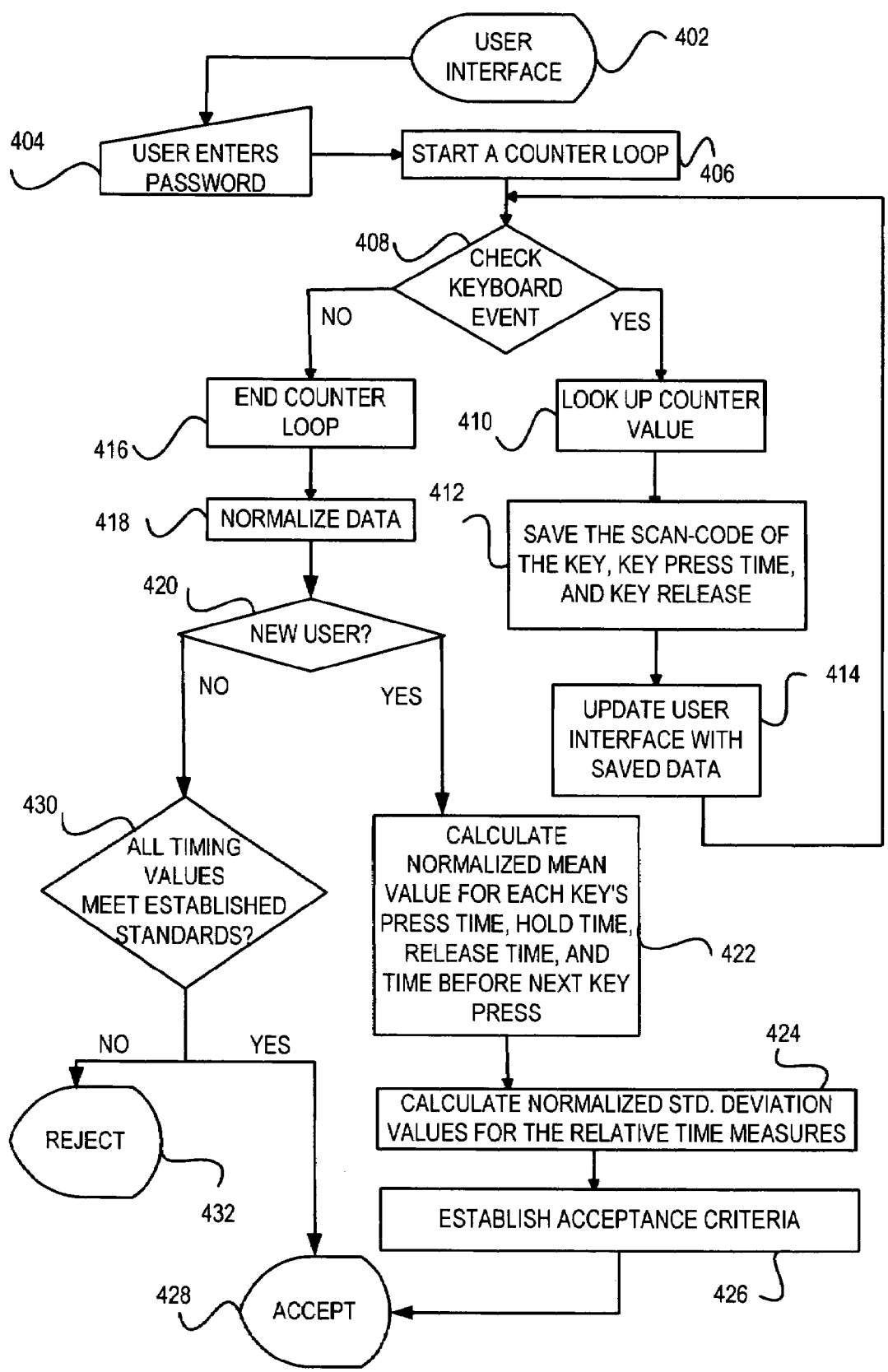
FIG. 4 shows, in accordance with an embodiment of the present invention, a flowchart illustrating the steps of a high-level algorithm for collecting keystroke values, displaying data on the user interface, and calculating the acceptance criteria for the latency dynamics.

FIG. 4 represents, in accordance with an embodiment of the present invention, a flowchart illustrating the steps of a high-level algorithm for collecting keystroke values, displaying data on the user interface, and calculating the acceptance criteria for the latency dynamics. The algorithm may be coded using Microsoft™ Visual C++ 6.0 or other similar programming languages. Also, the software algorithm may, in an embodiment, be loaded directly onto the user's electronic device. Localizing the software algorithm may eliminate any time measurement error that may be related to packet transmission delay over a network. Thus, network delay does not affect the accuracy of the relative latency value measurements and/or calculations.

In step 402, the user interface may be displayed on an application that utilizes password protection. In step 404, the user may enter the password. When the password is first entered, a counter loop may be started (step 406). For example, the clock of the operating system may be used as the counter to measure the relative time measurement of the password. In step 408, a keyboard event may be checked to detect whether or not a key is being pressed or released. If a keyboard event is detected, the counter value may be looked up in step 410.

In step 412, the scan code of the key, key press time, and key release time may be saved for each keystroke. As discussed herein, scan codes are unique 16-bit unsigned integers that are assigned to each key on a keyboard. Table 1 maps the corresponding scan code value to each key on the pneumatic keyboard. For example, the scan code for the "l" key is 38.

TABLE 1

Regular Keyboard Keys and Scan Codes

| Scan Code | Key |
|---|---|
| 1 | Esc |
| 2 | 1 |
| 3 | 2 |
| 4 | 3 |
| 5 | 4 |
| 6 | 5 |
| 7 | 6 |
| 8 | 7 |
| 9 | 8 |
| 10 | 9 |
| 11 | 0 |
| 12 | - |
| 13 | = |
| 14 | Back |
| 15 | Tab |
| 16 | Q |
| 17 | W |
| 18 | E |
| 19 | R |
| 20 | T |
| 21 | Y |
| 22 | U |
| 23 | I |
| 24 | O |
| 25 | P |
| 26 | [ |
| 27 | ] |
| 28 | Enter |
| 29 | Ctrl |
| 30 | A |
| 31 | S |
| 32 | D |
| 33 | F |
| 34 | G |
| 35 | H |
| 36 | J |
| 37 | K |
| 38 | L |
| 39 | ; |
| 40 | ' |
| 41 | ` |
| 42 | L-Sh |
| 43 | \ |
| 44 | Z |
| 45 | X |
| 46 | C |
| 47 | V |
| 48 | B |
| 49 | N |
| 50 | M |
| 51 | , |
| 52 | . |
| 53 | / |
| 54 | R-Sh |
| 55 | * |
| 56 | Alt |
| 57 | Space |
| 58 | Caps |
| 59 | F1 |
| 60 | F2 |
| 61 | F3 |
| 62 | F4 |
| 63 | F5 |
| 64 | F6 |
| 65 | F7 |
| 66 | F8 |
| 67 | F9 |
| 68 | F10 |
| 69 | Num |
| 70 | Print |
| 71 | 7 |
| 72 | 8 |
| 73 | 9 |
| 74 | - |
| 75 | 4 |
| 76 | 5 |
| 77 | 6 |
| 78 | + |
| 79 | 1 |
| 80 | 2 |
| 81 | 3 |
| 82 | 0 |
| 87 | F11 |
| 88 | F12 |

Since scan codes may be used to identify the keys that a user may enter, non-traditional keys (e.g., function keys, right shift key, brackets, etc.) may be used as characters in a user's password. For example, the word "Cat" may be saved as three possible different scan code combinations. For instance, the user may type the word "Cat" as follow: left-shift key, "c" key, "a" key, and "t" key; thus, the scan code combination is 42, 46, 30, and 20. However, if the user types the word "Cat" using the right-shift key instead of the left-shift key, the scan code combination is 54, 46, 30, and 20. Furthermore, if the user decides to use the "caps" key instead of the "shift" key, then the scan code combination can also be 58, 46, 30, and 20. Based on the algorithm, these three scan code combinations are three unique combinations and represent three different passwords. By associating scan codes with passwords, an additional level of fortification may be added to passwords.

At step 414, the saved data may be sent to update the graphical user interface and provide the user a visual feedback of his latency dynamics. The system may then return to step 408 to check for the next keyboard event. If a keyboard event is not detected, the counter loop may be terminated at step 416.

The following example illustrates how keyboard events may be recorded and saved. Assuming the user's password is "cat", the user first presses the "c" key. The system identifies a keyboard event (step 408) and starts the counter and sets the pressed time of "c" key to be $t_0$ (step 410). The system saves the scan code associated with the "c" key, which is scan code 46 (step 412). The "c" key is displayed on the user interface (with the down arrow) and the time associated with the key is also shown (Step 414). The user then releases the "c" key while pressing the "a" key a few milliseconds later. Identifying another keyboard event (step 408), the system checks the counter to record the time measurement value (200 milliseconds). The scan code, key press time, and key release time for the "a" key are saved. The saved data is then displayed graphically on the user interface. The system then proceeds to continue checking for keyboard events (step 408) until no new keyboard event is detected.

Based on the data collected, a plurality of relative latency values may be determined. For example, Table 2 shows the data that have been collected for the password "cat".

TABLE 2

Example of time measurement values collected (milliseconds)

| Key | Key Press Time | Key Release Time |
|---|---|---|
| c | 0 | 200 |
| a | 500 | 800 |
| t | 700 | 1000 |

Using the data measured (as shown in Table 2), a plurality of relative latency values for each keystroke may be determined. The key press time and the key release time represent the time measurements. The key hold time and the time before next key press may be calculated based on the key press time and the key release time. For example, the "c" key is pressed at $t_0$ and released at time 200. To calculate the key hold time, the key press time is subtracted from the key release time. Thus, the key hold time is 200. Since the "a" key is not pressed until at time 500, the time before next key press is time 300. Table 3 shows the calculated values for a plurality of relative latency values for the password "cat".

TABLE 3

Calculated relative time measurement values (milliseconds)

| Key | Key Press Time | Key Hold Time | Key Release Time | Time Before Next Key Press |
|---|---|---|---|---|
| c | 0 | 200 | 200 | 300 |
| a | 500 | 300 | 800 | -100 |
| t | 700 | 300 | 1000 | N/A |

The time before the next keys press may be a negative or positive value. A negative value represents a time value for overlapping keys. For example, Table 2 shows that the key "t" is pressed (time 700) before the key "a" is released (time 800). Thus, the time value for the overlapping keys "a" and "t" is negative 100 (as shown on Table 3).

At step 418, the saved data may be normalized. The data may be normalized since the latency dynamic authentication method is based on a user's rhythm instead of absolute time measurement. By normalizing the data, the user rhythm may be constant even though the length of time to enter a password may vary. For example, the first time a user types the password "cat" the relative latency values are as shown in Table 3. In a future logon session, the user enters the password "cat" at a slower rhythm (as shown in Table 4). However, when the relative latency values of the initial session (Table 3) and the latter session (Table 4) are normalized using Equation 1, the relative latency values are the same.

TABLE 4

Calculated relative time measures (milliseconds)

| Key | Key Press Time | Key Hold Time | Key Release Time | Time Before Next Key Press |
|---|---|---|---|---|
| c | 0 | 100 | 100 | 150 |
| a | 250 | 150 | 400 | -50 |
| t | 350 | 150 | 500 | N/A |

Equation 1 shows how relative latency values for each keystroke may be normalized.

$$NormalizedTime_i = \frac{MeasuredTime_i \times 10000}{TotalTime} \quad \text{(Equation 1)}$$

In Equation 1, the MeasuredTime may be one of a plurality of relative latency values for a keystroke. For example, the MeasuredTime may be a key press time for a keystroke. The TotalTime is the summation of the time measurement values from when a user first presses the first key to the time he releases the last key of the password. In an embodiment of the invention, times may be recorded in milliseconds to allow for higher granularity. The MeasureTime may be multiplied by 10,000, in an embodiment. The value of 10,000 is random and can be any given number since the values are normalized. Table 5 below shows the normalized time for Tables 3 and 4.

TABLE 5

Normalized calculated relative time measures (milliseconds)

| Key | Key Press Time | Key Hold Time | Key Release Time | Time Before Next Key Press |
|---|---|---|---|---|
| c | 0 | 2000 | 2000 | 3000 |
| a | 5000 | 3000 | 8000 | -1000 |
| t | 7000 | 3000 | 10000 | N/A |

Once a plurality of relative latency values has been normalized, the system proceeds to step 420. In the case of a new user (step 420), the system may proceed to step 422 to calculate the normalized mean values for each key press time, key hold time, key release time, and time before next key press using Equation 2. Equation 2 is the normalized mean value of a MeasuredTime (e.g., key press time). For example, the password "cat" is entered a plurality of times (e.g., 20 times). Thus, there are 20 time measurement values for the key press time of the "c" key. Hence, the mean of the key press time of the "c" key is the summation of each of the time measurement values of the key press time for the "c" key divided by the total number of key press time values (e.g., 20) collected for the "c" key.

$$\overline{MeasuredTime_i} = \frac{\sum_j MeasuredTime_j}{n} \quad \text{(Equation 2)}$$

At step 424, the standard deviation value for each time measurement value may be calculated based on the normalized mean value that has been calculated using Equation 2. Equation 3 shows the formula that may be used to calculate the normalized standard deviation value for each key press time, key release time, key hold time, and time before next key press. For example, for a password "cat" there may be a total of 12 standard deviation values—a standard deviation value for each of the latency values (i.e., key press time, key hold time, key release time, and time before next key press) of the "c" key, a standard deviation value for each of the latency values of the "a" key, and a standard deviation value for each of the latency values of the "t" key.

$$S_{MeasuredTime_i} = \sqrt{\frac{\sum_j (MeasuredTime_j - \overline{MeasuredTime})^2}{n}} \quad \text{(Equation 3)}$$

Once the normalized mean and standard deviation values have been calculated, at step 426, the established statistical standards that is used as acceptance criteria for each keystroke may be determined based on the calculated mean and standard deviation values of the relative latency values. In an embodiment of the invention, the established statistical standards used as acceptance criteria may be set at "mean +/−3 standard deviation" value. Based on the established statistical standards used as acceptance criteria, 99.7 percent of all future relative latency values may fall within the acceptable range. In other words, a user may be able to consistently provide the same latency dynamics patterns 997 out of 1000 times.

The established statistical standards are not limited to the "mean +/−3 standard deviation" value. Other standards, such as "mean +/−1 standard deviation" value, may be used. Once the established statistical standards used as acceptance criteria have been defined, the new user may be able to access the account (step 428).

However, if at step 420, the user is a registered user, the relative latency values may be checked against the calculated established statistical standards used as acceptance criteria at step 430. If the current relative latency values meet the established statistical standards, the password may be accepted (step 428). However, if the relative latency values fail to meet the acceptance criteria, the password may be rejected (step 432).

There are several advantages with the embodiments of the present invention. First, by recording multiple sets of a plurality of relative latency values, a statistical significant pool of samples may be used to define established statistical standards used as acceptance criteria. Second, embodiments of the invention allow for a method to authenticate or reject with statistical confidence a registered user without employing extraneous, expensive biometric acquisition hardware device. Third, unlike the absolute time measurement identity authentication method, embodiments of this invention may require only one variable (e.g., password) instead of four variables (i.e., username, password, first name, and last name) to attain a user's latency dynamics. However, more than one variable may be used to create the latency dynamics.

Fourth, a graphic user interface provides for a visual feedback of the latency dynamics. Using the graphic user interface, the user may be able to tune his keystroke pattern. Fifth, more features of a keystroke are being used to embody the relative latency values. Sixth, by normalizing the relative latency values, users are less likely to be erroneously rejected if their typing speeds vary even though their latency dynamics did not.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents that fall within the true spirit and scope of the present invention.

What is claimed is:

1. A method for authenticating user access by a user to an electronic device, comprising:
   measuring a first plurality of relative latency values as keystrokes pertaining to an authentication process are entered;
   dividing one or more of said first plurality of latency values by a total length of time for the user to enter said keystrokes to obtain a normalized relative latency value; and
   determining whether normalized relative latency values meet established statistical standards based on a previous plurality of relative latency values obtained from the user;
   if said normalized relative latency values meet said established statistical standards based on said previous plurality of relative latency values obtained from the user, permitting the user access.

2. The method of claim 1 wherein the keystrokes comprise a password.

3. The method of claim 1 wherein said previous plurality of relative latency values include at least a plurality of a key press time, a key hold time, a key release time, and a time before next key press.

4. The method of claim 1 wherein said previous plurality of relative latency values include a key press time, a key hold time, a key release time, and a time before next key press.

5. The method of claim 1 wherein said first plurality of relative latency values include at least a plurality of a key press time, a key hold time, a key release time, and a time before next key press for each key entered.

6. The method of claim 1 wherein said first plurality of relative latency values include a key press time, a key hold time, a key release time, and a time before next key press for each key entered.

7. The method of claim 1, further comprising:
   providing the user a graphical representation of at least a portion of one or more relative latency values.

8. An apparatus for authenticating user access by a user to an electronic device, comprising:
   means for measuring a first plurality of relative latency values as keystrokes pertaining to an authentication process are entered;
   means for determining whether said first plurality of relative latency values meet established statistical standards based on a previous plurality of relative latency values obtained from the user;
   means for permitting the user access if said first plurality of relative latency values meet said established statistical standards based on said previous plurality of relative latency values obtained from the user;
   means for providing the user a graphical representation of at least a portion of one or more relative latency values; and
   training the user in entering user authentication entries by displaying a first graphical representation of a first user authentication entered by the user; and simultaneously displaying a second graphical representation of a second user authentication entered by the user for the user to compare said first graphical representation and said second graphical representation.

9. The apparatus of claim 8 wherein each of said multiple sets of relative latency values include at least a plurality of a key press time, a key hold time, a key release time, and a time before next key press.

10. The apparatus of claim 8 wherein each of said multiple sets of relative latency values include a key press time, a key hold time, a key release time, and a time before next key press.

11. The apparatus of claim 8 wherein said first plurality of relative latency values include at least a plurality of a key press time, a key hold time, a key release time, and a time before next key press for each key entered.

12. The apparatus of claim 8 wherein said first plurality of relative latency values include a key press time, a key hold time, a key release time, and a time before next key press for each key entered.

13. The apparatus of claim 8, wherein one or more of said relative latency values are normalized.

14. A method for authenticating user access by a user to an electronic device, comprising:
   measuring a first plurality of relative latency values for a plurality of user authentication entries entered by the user;
   calculating a second plurality of relative latency values based on said first plurality of relative latency values;
   calculating a third plurality of relative latency values, said set of third plurality of latency values being statistical representations of said first plurality of relative latency values and said second plurality of relative latency values;
   providing the user a graphical representation of at least a portion of one or more relative latency value; and
   employing said third plurality of relative latency values for said authenticating; and
   training the user in entering user authentication entries by displaying a first graphical representation of a first user authentication entered by the user; and simultaneously displaying a second graphical representation of a second user authentication entered by the user for the user to compare said first graphical representation and said second graphical representation.

15. The method of claim 14 wherein said first plurality of relative latency values represent key press times and key release times for keystrokes of said plurality of user authentication entries.

16. The method of claim 14 wherein said second plurality of relative latency values represent key hold times and times before next key press for said keystrokes of said plurality of user authentication entries.

17. The method of claim 14 wherein said providing the user a graphical representation comprises:
   displaying a time duration scale with a plurality of time periods corresponding to individual keystrokes.

18. The method of claim 14, wherein one or more of said relative latency values are normalized.

* * * * *

UNITED STATES PATENT AND TRADEMARK OFFICE
CERTIFICATE OF CORRECTION

PATENT NO. : 7,571,326 B2  Page 1 of 1
APPLICATION NO. : 11/138511
DATED : August 4, 2009
INVENTOR(S) : Wenying Chen It is certified that error appears in the above-identified patent and that said Letters Patent is hereby corrected as shown below:

In column 12, line 16, in Claim 1, delete "value;" and insert -- values; --, therefor.

In column 14, line 2, in Claim 14, delete "value;" and insert -- values; --, therefor.

Signed and Sealed this

Thirteenth Day of July, 2010

David J. Kappos
*Director of the United States Patent and Trademark Office*